(12) United States Patent
Bian

(10) Patent No.: US 11,886,021 B2
(45) Date of Patent: Jan. 30, 2024

(54) SLOTTED WAVEGUIDES INCLUDING A METAMATERIAL STRUCTURE

(71) Applicant: GlobalFoundries U.S. Inc., Malta, NY (US)

(72) Inventor: Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 0 days.

(21) Appl. No.: 17/705,911

(22) Filed: Mar. 28, 2022

(65) Prior Publication Data

US 2023/0305242 A1  Sep. 28, 2023

(51) Int. Cl.
| | |
|---|---|
| *G02B 6/02* | (2006.01) |
| *G02B 6/122* | (2006.01) |
| *G02B 6/13* | (2006.01) |
| *G02B 6/30* | (2006.01) |
| *G02B 6/42* | (2006.01) |
| *G02B 6/12* | (2006.01) |

(52) U.S. Cl.
CPC ....... *G02B 6/4203* (2013.01); *G02B 6/12002* (2013.01); *G02B 6/1228* (2013.01); *G02B 6/13* (2013.01); *G02B 6/305* (2013.01)

(58) Field of Classification Search
CPC .... G02B 6/13; G02B 6/12002; G02B 6/1228; G02B 6/305
See application file for complete search history.

(56) References Cited

U.S. PATENT DOCUMENTS

| | | | |
|---|---|---|---|
| 9,703,047 B2 * | 7/2017 | Painchaud | ............ G02B 6/124 |
| 10,816,726 B1 | 10/2020 | Peng et al. | |
| 2021/0278611 A1 | 9/2021 | Sahin et al. | |

OTHER PUBLICATIONS

Yusheng Bian, "Edge Couplers With a Partially-Etched Inverse Taper" filed on Aug. 5, 2020 as a U.S. Appl. No. 16/985,645.
Kevin K. Dezfulian et al., "Hybrid Edge Couplers With Layers in Multiple Levels" filed on Feb. 8, 2021 as a U.S. Appl. No. 17/169,971.
Yusheng Bian, "Edge Couplers With Metamaterial Rib Features" filed on Jul. 7, 2021 as a U.S. Appl. No. 17/369,253.
Mu, Xin et al., "Edge Couplers in Silicon Photonic Integrated Circuits: A Review," Applied Sciences. 10. 1538. 10.3390/app10041538 (2020).

(Continued)

*Primary Examiner* — Omar R Rojas
(74) *Attorney, Agent, or Firm* — Thompson Hine LLP; Anthony Canale

(57) ABSTRACT

Photonics structures including a slotted waveguide and methods of fabricating such photonics structures. The photonics structure includes a slotted waveguide having a first waveguide core and a second waveguide core laterally positioned adjacent to the first waveguide core. The first waveguide core is separated from the second waveguide core by a slot. The photonics structure further includes a metamaterial structure having a plurality of elements separated by a plurality of gaps and a dielectric material in the plurality of gaps. The metamaterial structure and the slot of the slotted waveguide are positioned with an overlapping arrangement.

13 Claims, 6 Drawing Sheets

(56) References Cited

OTHER PUBLICATIONS

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

Y. Bian et al., "3D Integrated Laser Attach Technology on 300-mm Monolithic Silicon Photonics Platform," 2020 IEEE Photonics Conference (IPC), pp. 1-2, doi: 10.1109/IPC47351.2020.9252280 (2020).

B. Peng et al., "A CMOS Compatible Monolithic Fiber Attach Solution with Reliable Performance and Self-alignment," in Optical Fiber Communication Conference (OFC), OSA Technical Digest (Optica Publishing Group, 2020), paper Th3I.4 (2020).

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group, 2020), paper FW5D.2 (2020).

M. Rakowski et al., "45nm CMOS—Silicon Photonics Monolithic Technology (45CLO) for next-generation, low power and high speed optical interconnects," in Optical Fiber Communication Conference (OFC), OSA Technical Digest (Optica Publishing Group, 2020), paper T3H.3 (2020).

Y. Bian et al., "Monolithically integrated silicon nitride platform," 2021 Optical Fiber Communications Conference and Exhibition (OFC), Th1A.46 pp. 1-3 (2021).

Y. Bian et al., "Hybrid III-V laser integration on a monolithic silicon photonic platform," 2021 Optical Fiber Communications Conference and Exhibition (OFC), M5A.2, pp. 1-3 (2021).

\* cited by examiner

US 11,886,021 B2

SLOTTED WAVEGUIDES INCLUDING A METAMATERIAL STRUCTURE

BACKGROUND

The disclosure relates to photonics chips and, more specifically, to photonics structures including a slotted waveguide and methods of fabricating such photonics structures.

Photonics chips are used in many applications and systems including, but not limited to, data communication systems and data computation systems. A photonics chip integrates optical components, such as waveguides, photodetectors, modulators, and optical power splitters, and electronic components, such as field-effect transistors, into a unified platform. Among other factors, layout area, cost, and operational overhead may be reduced by the integration of both types of components on the same chip.

An edge coupler, also known as a spot-size converter, is an optical component that is commonly used for coupling light of a given mode from a light source, such as a laser or an optical fiber, to other optical components on the photonics chip. The edge coupler may include a section of a waveguide core that defines an inverse taper having a tip. In the edge coupler construction, the narrow end of the inverse taper provides a facet at the tip that is positioned adjacent to the light source, and the wide end of the inverse taper is connected to another section of the waveguide core that routes the light to the optical components of the photonics chip.

The gradually-varying cross-sectional area of the inverse taper supports mode transformation and mode size variation associated with mode conversion when light is transferred from the light source to the edge coupler. The tip of the inverse taper is unable to fully confine the incident mode received from the light source because the cross-sectional area of the tip is considerably smaller than the mode size. Consequently, a significant percentage of the electromagnetic field of the incident mode is distributed about the tip of the inverse taper. As its width increases, the inverse taper can support the entire incident mode and confine the electromagnetic field.

Waveguides may suffer from time/group delay between transverse electrode mode and transverse magnetic mode polarizations because of differences in group indices (i.e., group velocities) for light propagation. Light of the different polarization modes essentially travels at different speeds when guided by a birefringent optical medium, such as the material constituting the waveguide core of the waveguide, that is characterized by polarization-dependent refractive indices. The time/group delay, which may be on the order of only a few picoseconds, may have particularly significance for waveguides incorporated into edge couplers.

Improved photonics structures including a slotted waveguide and methods of fabricating such photonics structures are needed.

SUMMARY

In an embodiment of the invention, a photonics structure comprises a slotted waveguide including a first waveguide core and a second waveguide core positioned adjacent to the first waveguide core. The first waveguide core is separated from the second waveguide core by a slot. The photonics structure further comprises a metamaterial structure including a plurality of elements separated by a plurality of gaps and a dielectric material in the plurality of gaps. The metamaterial structure and the slot of the slotted waveguide are positioned with an overlapping arrangement.

In an embodiment of the invention, a method of forming a photonics structure comprises forming a slotted waveguide including a first waveguide core and a second waveguide core positioned adjacent to the first waveguide core. The first waveguide core is separated from the second waveguide core by a slot. The method further comprises forming a metamaterial structure including a plurality of elements separated by a plurality of gaps and a dielectric material in the plurality of gaps. The metamaterial structure and the slot of the slotted waveguide are positioned with an overlapping arrangement.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
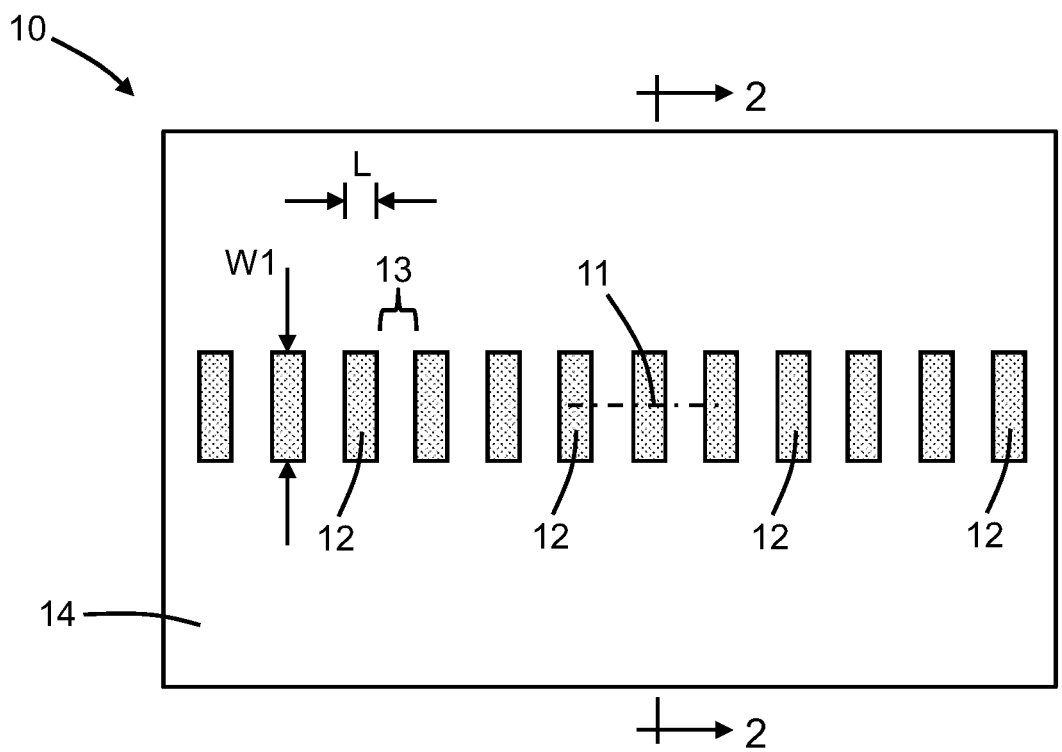
FIG. 1 is a top view of a photonics structure at an initial fabrication stage of a processing method in accordance with embodiments of the invention.
Figure 2:
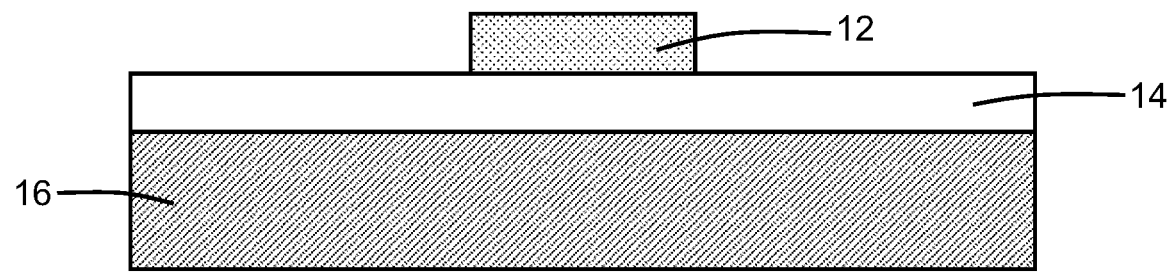
FIG. 2 is a cross-sectional view taken generally along line 2-2 in FIG. 1.

With reference to FIGS. 1, 2 and in accordance with embodiments of the invention, a photonics structure 10 includes a plurality of elements 12 that are positioned in a row with spaced-apart arrangement along a longitudinal axis 11. Adjacent pairs of the elements 12 are separated by a gap 13. The elements 12 may be positioned in a vertical direction over a dielectric layer 14 and a substrate 16. In an embodiment, the dielectric layer 14 may be comprised of a dielectric material, such as silicon dioxide, and the substrate 16 may be comprised of a semiconductor material, such as single-crystal silicon. In an embodiment, the dielectric layer 14 may be a buried oxide layer of a silicon-on-insulator substrate, and the dielectric layer 14 may separate the elements 12 from the substrate 16. The elements 12 may be comprised of a semiconductor material, such as single-crystal silicon. In an embodiment, the elements 12 may be formed by patterning a single-crystal silicon device layer of a silicon-on-insulator substrate with lithography and etching processes, and the dielectric layer 14 may operate as an etch stop when patterning the elements 12.

In an embodiment, each element 12 may have a square or rectangular cross-section in a direction parallel to the longitudinal axis 11. In an embodiment, the elements 12 may be embodied in cubes or cuboids that have planar or substantially planar faces. In an embodiment, the elements 12 may be disconnected from each other. In an embodiment, the elements 12 may have length, width, and height dimensions that are equal or substantially equal. In an embodiment, the elements 12 may have a width dimension W1 in a direction transverse to the longitudinal axis 11 and a length dimension L in a direction parallel to the longitudinal axis 11. In an embodiment, the pitch and duty cycle of the elements 12 may be uniform to define a periodic arrangement. In alternative embodiments, the pitch and/or the duty cycle of the elements 12 may be apodized (i.e., non-uniform) to define a non-periodic arrangement. The elements 12 may be dimensioned and positioned at small enough pitch so as to define a sub-wavelength grating that does not radiate or reflect light at a wavelength of operation, such as a wavelength in a range of 1260 nm to 1360 nm (the O-band).

Figure 3:
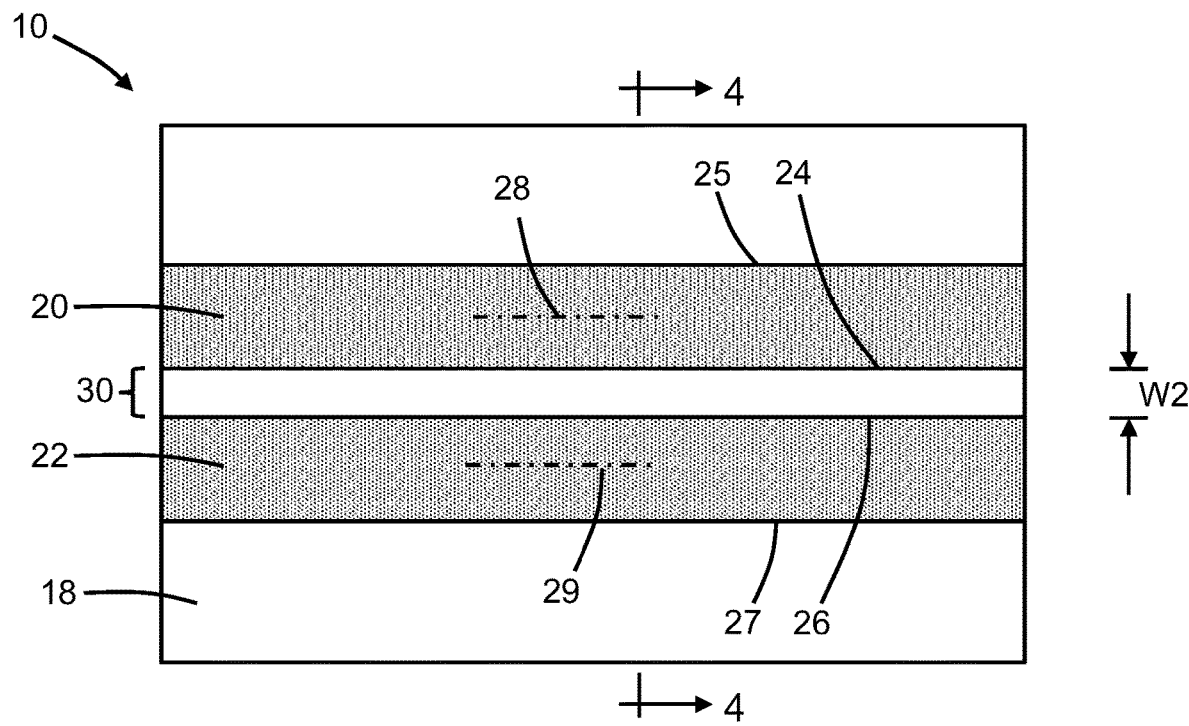
FIG. 3 is a top view of the photonics structure at a fabrication stage of the processing method subsequent to FIG. 1.
Figure 4:
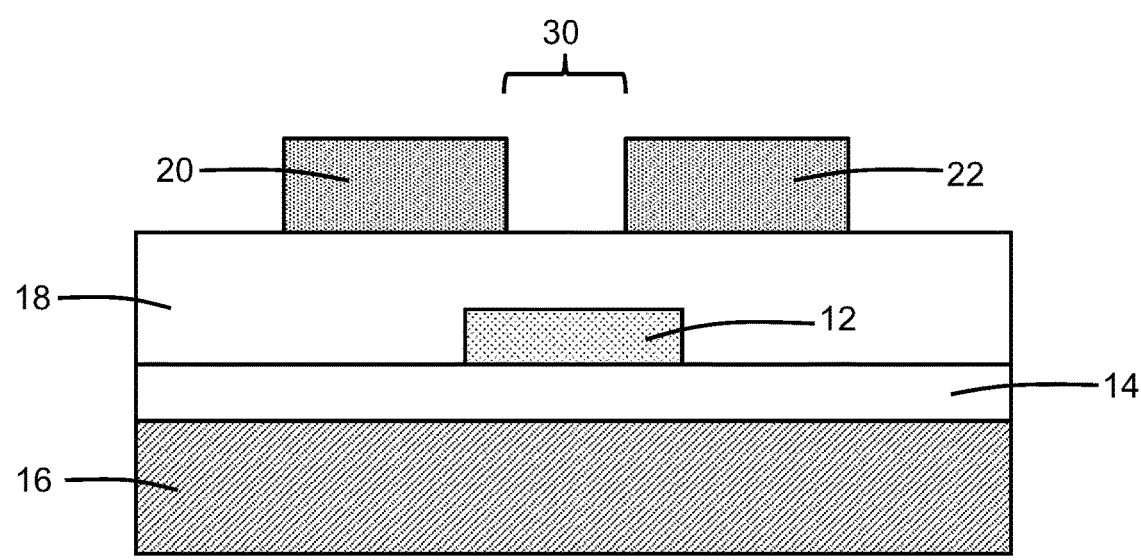
FIG. 4 is a cross-sectional view taken generally along line 4-4 in FIG. 3.

With reference to FIGS. 3, 4 in which like reference numerals refer to like features in FIGS. 1, 2 and at a subsequent fabrication stage, a dielectric layer 18 is formed over the elements 12. The dielectric layer 18 may be comprised of a dielectric material, such as silicon dioxide, that may be deposited and then planarized following deposition. The elements 12 are embedded in the dielectric layer 18 because the dielectric layer 18 is thicker than the height of the elements 12. The thickness of the dielectric layer 18 and the height of the elements 12 may be adjustable variables. The dielectric material constituting the dielectric layer 18 may have a refractive index that is less than the refractive index of the semiconductor material constituting the elements 12.

The dielectric material of the dielectric layer 18 is disposed in the gaps 13 between adjacent pairs of the elements 12. The elements 12 and the dielectric material of the dielectric layer 18 in the gaps 13 may define a metamaterial structure in which the semiconductor material constituting the elements 12 has a higher refractive index than the dielectric material of the dielectric layer 18. The metamaterial structure including the elements 12 and the dielectric material of the dielectric layer 18 in the gaps 13 can be treated as a homogeneous material with an effective refractive index that is intermediate between the refractive index of the semiconductor material constituting the elements 12 and the refractive index of the dielectric material of the dielectric layer 18.

A waveguide core 20 and a waveguide core 22 are formed over the elements 12. The waveguide cores 20, 22, which define a slotted waveguide, have a laterally-spaced juxtaposed (i.e., side-by-side) arrangement on the dielectric layer 18 with the waveguide core 20 laterally positioned adjacent to the waveguide core 22. The waveguide cores 20, 22 are stacked in a vertical direction over the elements 12 of the underlying metamaterial structure. The waveguide cores 20, 22 may be comprised of a dielectric material, such as silicon nitride, having a refractive index greater than the refractive index of silicon dioxide. In an embodiment, the waveguide cores 20, 22 may be formed by depositing a layer of their constituent material by chemical vapor deposition on the dielectric layer 18 and patterning the deposited layer by lithography and etching processes.

The waveguide core 20 may have sidewalls 24, 25 and may be aligned along a longitudinal axis 28. The waveguide core 22 may have sidewalls 26, 27 and may be aligned along a longitudinal axis 29. The sidewall 24 of the waveguide core 20 may be positioned adjacent to the sidewall 26 of the waveguide core 22 and laterally spaced from the sidewall 26 by a slot 30 having a width dimension W2. In an embodiment, the width dimension W2 of the slot 30 may be constant over the longitudinal extent of the elements 12. In an embodiment, the longitudinal axis 28 of the waveguide core 20 may be aligned parallel to the longitudinal axis 29 of the waveguide core 22. In an embodiment, the longitudinal axis 11 of the elements 12 may be aligned parallel to the longitudinal axes 28, 29 of the waveguide cores 20, 22.

The metamaterial structure including the elements 12 is positioned in a vertical direction between the substrate 16 and the waveguide cores 20, 22 of the slotted waveguide. Each of the waveguide cores 20, 22 may have a partially-overlapping relationship with elements 12. In that regard, a portion of the waveguide core 20 adjacent to the sidewall 24 may overlap with respective side edge portions of the elements 12, a portion of the waveguide core 22 adjacent to the sidewall 26 may overlap with respective side edge portions of the elements 12, and the slot 30 may have an overlapping arrangement with the elements 12. In an embodiment, the slot 30 may fully overlap with the elements 12. A portion of the waveguide core 20 adjacent to the sidewall 25 may have a non-overlapping relationship with the elements 12, and a portion of the waveguide core 22 adjacent to the sidewall 27 may have a non-overlapping relationship with the elements 12. In an embodiment, the waveguide cores 20, 22 may be laterally positioned with a symmetrical arrangement relative to the elements 12 such that the slot 30 between the waveguide cores 20, 22 is centered relative to the elements 12.

In alternative embodiments, the elements 12 and waveguide cores 20, 22 may be comprised of a different type of material, such as a III-V compound semiconductor material.

Figure 5:
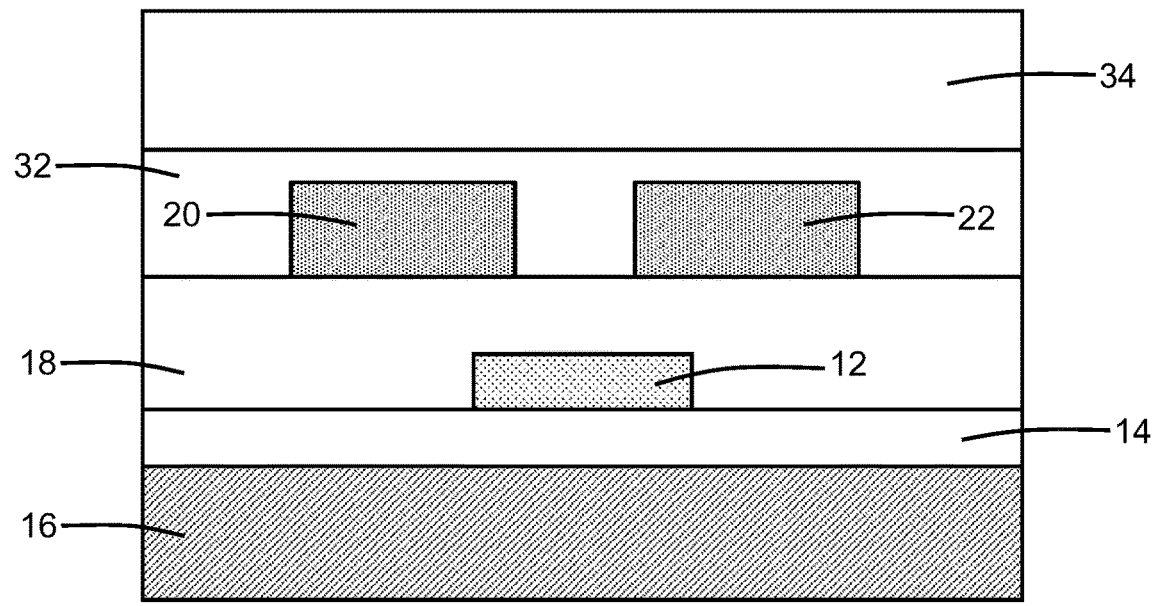
FIG. 5 is a cross-sectional view of the photonics structure at a fabrication stage of the processing method subsequent to FIG. 4.

With reference to FIG. 5 in which like reference numerals refer to like features in FIG. 4 and at a subsequent fabrication stage, a dielectric layer 32 may be formed over the dielectric layer 18 and waveguide cores 20, 22. The waveguide cores 20, 22 are embedded in the dielectric layer 32, which may be deposited and then planarized following deposition, and the dielectric material of the dielectric layer 32 fills the slot 30. The dielectric layer 32 may be comprised of a dielectric material, such as silicon dioxide, having a refractive index that is less than the refractive index of the dielectric material constituting the waveguide cores 20, 22.

A back-end-of-line stack 34 may be formed over the dielectric layer 32. The back-end-of-line stack 34 may include stacked dielectric layers that are comprised of a dielectric material, such as silicon dioxide, tetraethylorthosilicate silicon dioxide, or fluorinated-tetraethylorthosilicate silicon dioxide.

The photonics structure 10, in any of its embodiments described herein, may be integrated into a photonics chip that includes electronic components and additional optical components. For example, the electronic components may include field-effect transistors that are fabricated by CMOS processing.

The metamaterial structure including the elements 12 may be effective to reduce birefringence and differential group delay in the slotted waveguide defined by the waveguide cores 20, 22. Specifically, the time/group delay between transverse electrode mode and transverse magnetic mode polarizations for propagating light guided by the waveguide cores 20, 22 may be reduced, and propagating light of the different polarization modes may travel at more similar speeds when guided by the waveguide cores 20, 22. For example, the time/group delay between light with transverse electrode mode polarization and light with transverse magnetic mode polarization may be reduced by about three orders of magnitude compared to a conventional slotted waveguide, which is a significantly greater reduction than expected.

Figure 6:
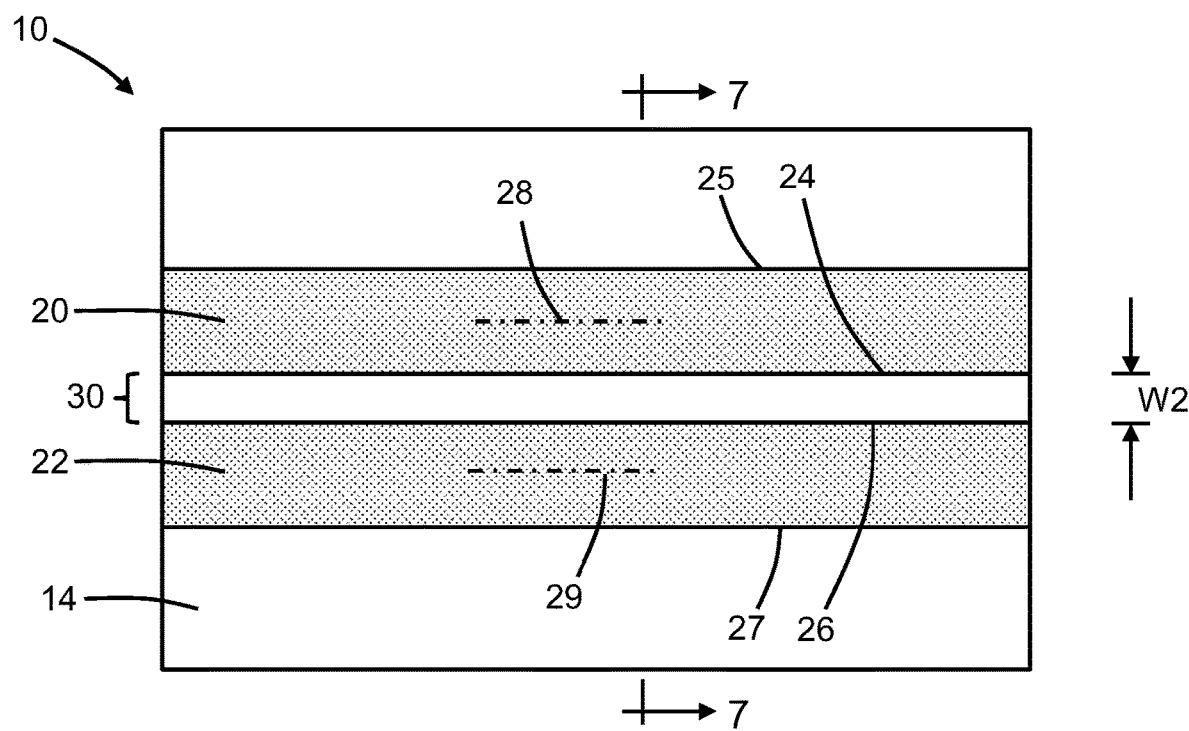
FIG. 6 is a top view of a photonics structure at an initial fabrication stage of a processing method in accordance with embodiments of the invention.
Figure 7:
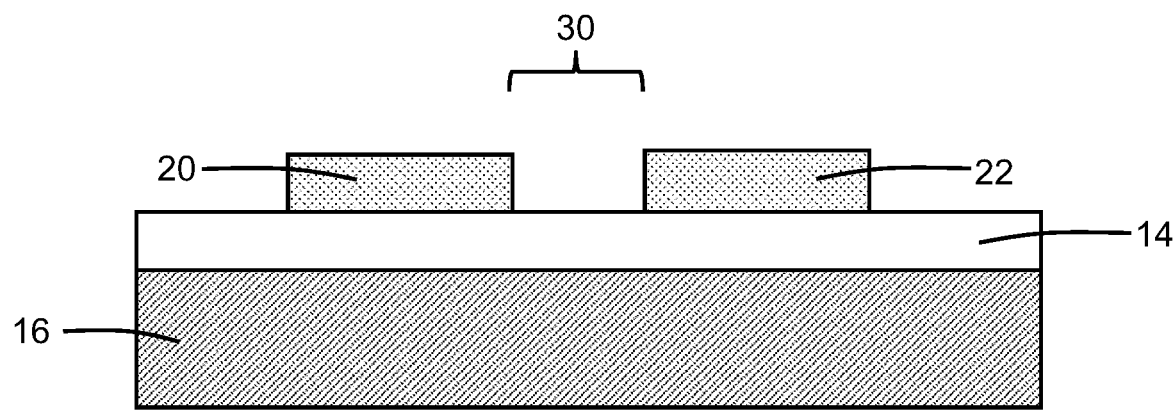
FIG. 7 is a cross-sectional view taken generally along line 7-7 in FIG. 6.

With reference to FIGS. 6, 7 and in accordance with alternative embodiments of the invention, the photonics structure 10 may be inverted such that the metamaterial structure including the elements 12 is positioned over the waveguide cores 20, 22, and the waveguide cores 20, 22 of the slotted waveguide are positioned in a vertical direction between the metamaterial structure and the substrate 16. To that end, the waveguide cores 20, 22 may be formed on the dielectric layer 14 and laterally positioned adjacent to each other to define the slot 30. The waveguide cores 20, 22 may be comprised of a semiconductor material, such as single-crystal silicon. For example, the waveguide cores 20, 22 may be formed by patterning a single-crystal silicon device layer of a silicon-on-insulator substrate with lithography and etching processes, and the dielectric layer 14 may operate as an etch stop when patterning the elements 12.

Figure 8:
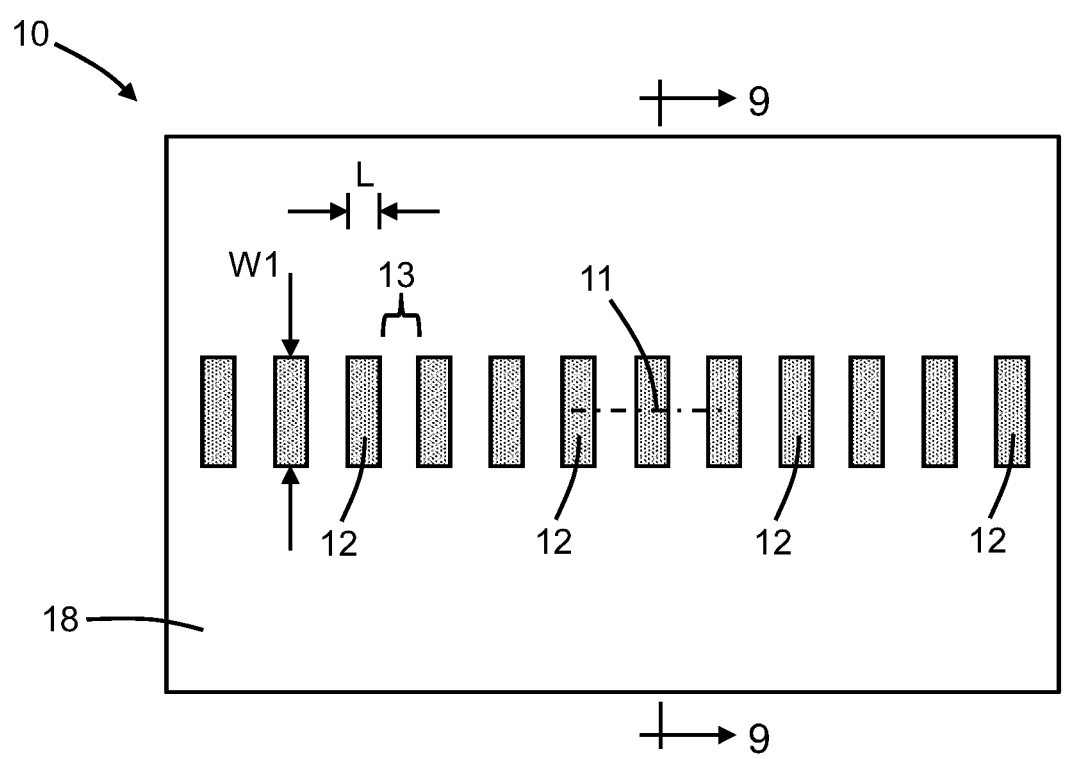
FIG. 8 is a top view of the photonics structure at a fabrication stage of the processing method subsequent to FIG. 6.
Figure 9:
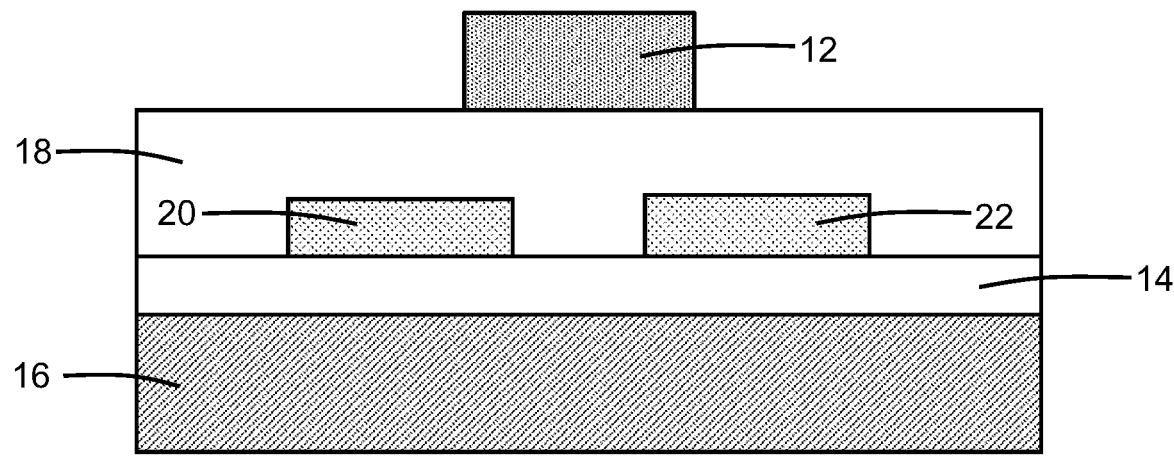
FIG. 9 is a cross-sectional view taken generally along line 9-9 in FIG. 8.

With reference to FIGS. 8, 9 in which like reference numerals refer to like features in FIGS. 6, 7 and at a subsequent fabrication stage, the dielectric layer 18 may be deposited over the waveguide cores 20, 22 and planarized, and the elements 12 may then be formed on the dielectric layer 18 and over the waveguide cores 20, 22. The elements 12 may be comprised of a dielectric material, such as silicon nitride, having a refractive index greater than the refractive index of silicon dioxide. In an embodiment, the elements 12 may be formed by depositing a layer of their constituent dielectric material by chemical vapor deposition on the dielectric layer 18 and patterning the deposited dielectric material by lithography and etching processes. The elements 12 may have an overlapping arrangement with the slot 30 between the waveguide core 20 and the waveguide core 22. In an embodiment, the elements 12 may fully overlap with the slot 30. In an embodiment, the elements 12 may be centered relative to the slot 30 between the waveguide cores 20, 22.

Figure 10:
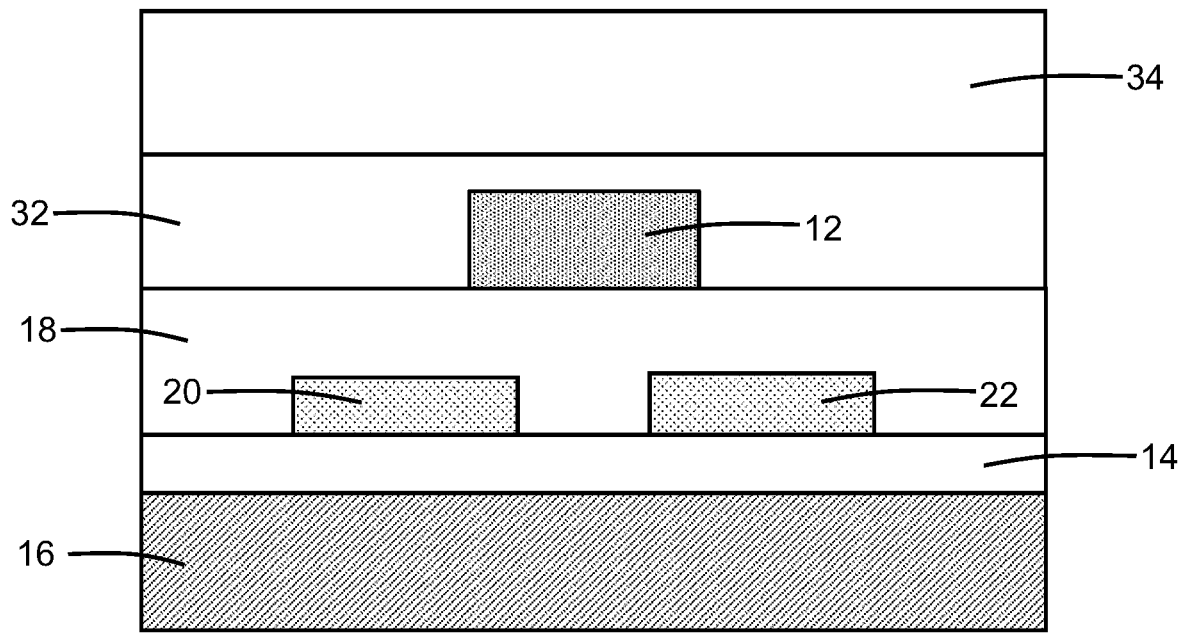
FIG. 10 is a cross-sectional view of the photonics structure at a fabrication stage of the processing method subsequent to FIG. 9.

With reference to FIG. 10 in which like reference numerals refer to like features in FIG. 9 and at a subsequent fabrication stage, the elements 12 are embedded in the subsequently-formed dielectric layer 32. The dielectric material constituting the dielectric layer 32, which may be silicon dioxide, may have a refractive index that is less than the refractive index of the material constituting the elements 12. The dielectric material of the dielectric layer 32 is disposed in the gaps 13 between adjacent pairs of the elements 12. The elements 12 and the dielectric material of the dielectric layer 32 in the gaps 13 may define a metamaterial structure in which the dielectric material constituting the elements 12 has a higher refractive index than the dielectric material of the dielectric layer 32. The metamaterial structure including the elements 12 and the dielectric material of the dielectric layer 32 in the gaps 13 can be treated as a homogeneous material with an effective refractive index that is intermediate between the refractive index of the dielectric material constituting the elements 12 and the refractive index of the dielectric material of the dielectric layer 32. The slotted waveguide including the waveguide cores 20, 22 is positioned in a vertical direction between the substrate 16 and the metamaterial structure including the elements 12.

Figure 11:
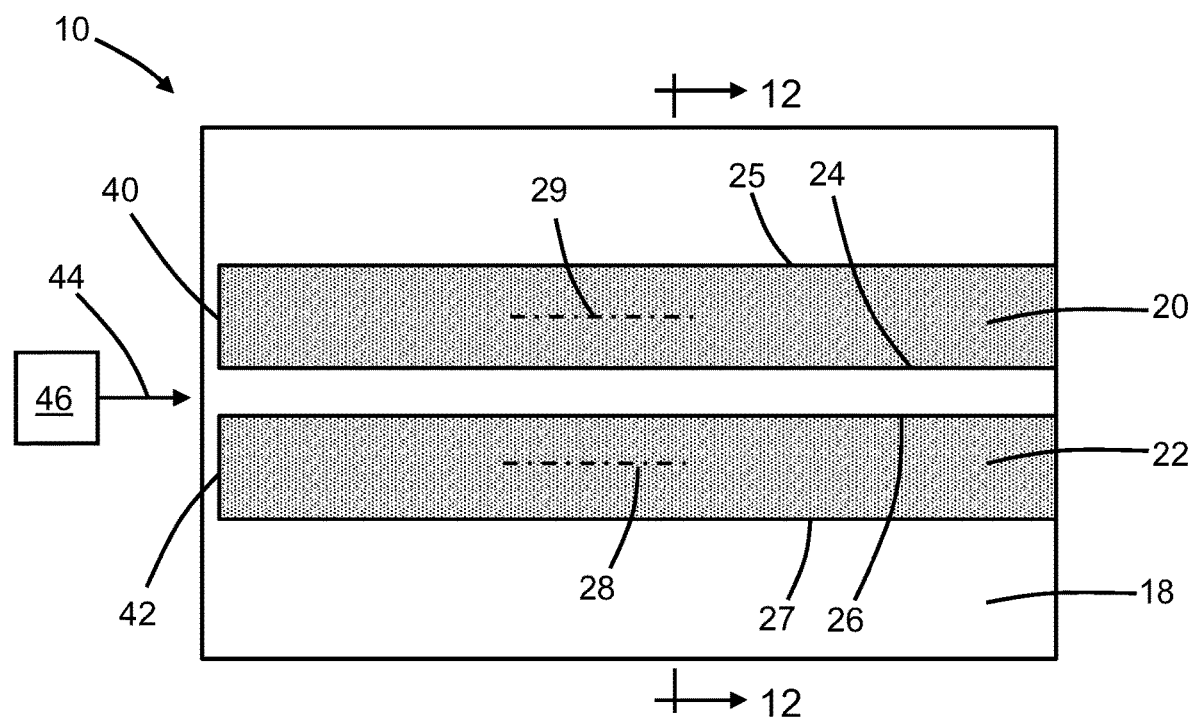
FIG. 11 is a top view of a photonics structure in accordance with alternative embodiments of the invention.
Figure 12:
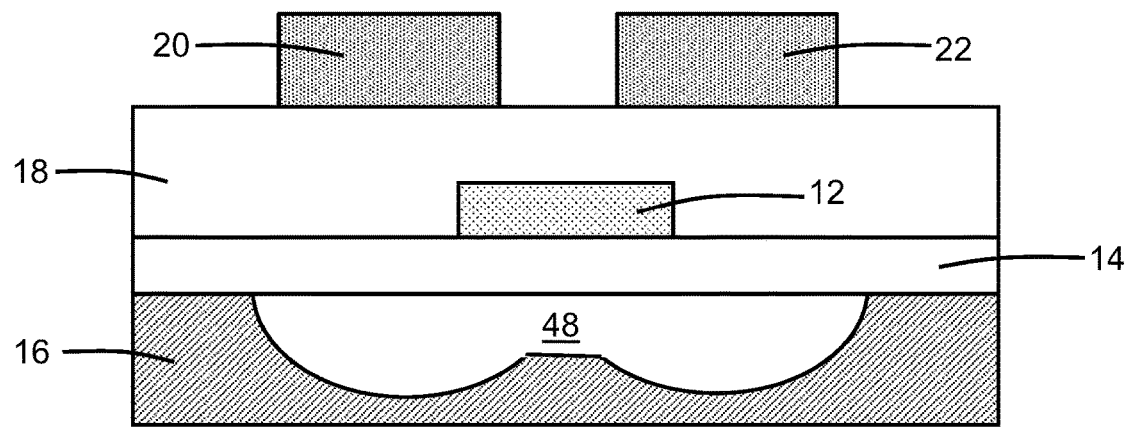
FIG. 12 is a cross-sectional view taken generally along line 12-12 in FIG. 11.

With reference to FIGS. 11, 12 and in accordance with alternative embodiments of the invention, the photonics structure 10 may be incorporated into an edge coupler. In that regard, the waveguide cores 20, 22 of the slotted waveguide may include end surfaces 40, 42, and the waveguide cores 20, 22 may define a slotted inverse taper that tapers with multiple taper angles. An inverse taper refers to a tapered section of a waveguide core characterized by a gradual increase in width along a mode propagation direction.

Light (e.g., laser light) may be provided in a mode propagation direction 44 from a light source 46 toward the end surfaces 40, 42 of the waveguide cores 20, 22. The light may have a given wavelength, intensity, mode shape, and mode size, and the edge coupler providing the representative optical component may provide spot size conversion for the light. In an embodiment, the light source 46 may be a single-mode optical fiber placed adjacent to the edge coupler. In an alternative embodiment, the light source 46 may be a semiconductor laser placed adjacent to the edge coupler, and the semiconductor laser may be attached inside a cavity formed in the substrate 16. The light source 46 may be positioned in a groove formed in the substrate 16, which may extend as an optional undercut 48 beneath the edge coupler. Alternatively, the optional undercut 48 may be omitted such that the substrate 16 is solid beneath the elements 12 and waveguide cores 20, 22.

The metamaterial structure including the elements 12 and the dielectric material of the dielectric layer 18 in the gaps 13 functions to reduce birefringence and differential group delay in the edge coupler.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A photonics structure comprising:
   a substrate;
   a slotted waveguide including a first waveguide core and a second waveguide core laterally positioned adjacent to the first waveguide core, the first waveguide core separated from the second waveguide core by a slot, the first waveguide core including a first sidewall and a first side edge portion adjacent to the first sidewall, the second waveguide core including a second sidewall and a second side edge portion adjacent to the second sidewall, and the slot extending from the first sidewall to the second sidewall; and
   a metamaterial structure including a plurality of elements separated by a plurality of gaps and a dielectric material in the plurality of gaps,
   wherein the slotted waveguide is positioned in a vertical direction between the substrate and the metamaterial structure, and the plurality of elements of the metamaterial structure overlap with the slot of the slotted waveguide, the first side edge portion of the first waveguide core, and the second side edge portion of the second waveguide core.

2. The photonics structure of claim 1 wherein the first waveguide core includes a first end surface and the second waveguide core includes a second end surface, and further comprising:
   a light source positioned adjacent to the first end surface and the second end surface, the light source configured to provide light in a mode propagation direction to the slotted waveguide.

3. The photonics structure of claim 2 wherein the light source is a semiconductor laser.

4. The photonics structure of claim 2 wherein the light source is an optical fiber.

5. The photonics structure of claim 2 wherein the slotted waveguide defines a slotted inverse taper.

6. The photonics structure of claim 1 wherein the plurality of elements comprise silicon nitride, the dielectric material comprises silicon dioxide, and the first waveguide core and the second waveguide core comprise silicon.

7. The photonics structure of claim 1 wherein the first waveguide core includes a first longitudinal axis, the second waveguide core includes a second longitudinal axis, the metamaterial structure includes a third longitudinal axis that is aligned parallel to the first longitudinal axis and the second longitudinal axis, and the plurality of elements are positioned in a spaced-apart arrangement along the third longitudinal axis.

8. The photonics structure of claim 1 wherein the plurality of elements are centered relative to the slot.

9. A method of forming a photonics structure, the method comprising:
   forming a slotted waveguide including a first waveguide core and a second waveguide core positioned adjacent to the first waveguide core, wherein the first waveguide core is separated from the second waveguide core by a slot, the first waveguide core includes a first sidewall and a first side edge portion adjacent to the first sidewall, the second waveguide core includes a second sidewall and a second side edge portion adjacent to the second sidewall, and the slot extends from the first sidewall to the second sidewall; and
   forming a metamaterial structure including a plurality of elements separated by a plurality of gaps and a dielectric material in the plurality of gaps, wherein the slotted waveguide is positioned in a vertical direction between a substrate and the metamaterial structure, and the plurality of elements of the metamaterial structure overlap with the slot of the slotted waveguide, the first side edge portion of the first waveguide core, and the second side edge portion of the second waveguide core.

10. The method of claim 9 wherein forming the metamaterial structure including the plurality of elements separated by the plurality of gaps and the dielectric material in the plurality of gaps comprises:
   patterning a semiconductor layer to define the plurality of elements; and
   depositing the dielectric material in the plurality of gaps.

11. The method of claim 9 wherein forming the metamaterial structure including the plurality of elements separated by the plurality of gaps and the dielectric material in the plurality of gaps comprises:
   patterning a dielectric layer to define the plurality of elements; and
   depositing the dielectric material in the plurality of gaps.

12. The method of claim 9 wherein the first waveguide core includes a first end surface and the second waveguide core includes a second end surface, and further comprising:
   placing a light source adjacent to the first end surface and the second end surface,
   wherein the light source is configured to provide light in a mode propagation direction to the slotted waveguide.

13. The method of claim 9 wherein the plurality of elements of the metamaterial structure comprise silicon nitride, and the first waveguide core and the second waveguide core comprise silicon.

* * * * *